(12) United States Patent
Golubchik

(10) Patent No.: US 12,489,265 B2
(45) Date of Patent: Dec. 2, 2025

(54) SYSTEM AND METHOD FOR ALIGNMENT OF BEAMS OF COHERENT BEAM ARRAY

(71) Applicant: RAFAEL ADVANCED DEFENSE SYSTEMS LTD., Haifa (IL)

(72) Inventor: Daniel Golubchik, Kiryat Bialik (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 286 days.

(21) Appl. No.: 18/269,621

(22) PCT Filed: Feb. 1, 2022

(86) PCT No.: PCT/IB2022/050858
§ 371 (c)(1),
(2) Date: Jun. 26, 2023

(87) PCT Pub. No.: WO2022/167930
PCT Pub. Date: Aug. 11, 2022

(65) Prior Publication Data
US 2024/0322514 A1    Sep. 26, 2024

(30) Foreign Application Priority Data

Feb. 3, 2021    (IL) .......................................... 280633

(51) Int. Cl.
| | |
|---|---|
| H01S 3/00 | (2006.01) |
| G02B 27/12 | (2006.01) |
| H01S 3/094 | (2006.01) |
| H01S 3/23 | (2006.01) |
| H01S 3/067 | (2006.01) |

(52) U.S. Cl.
CPC .......... *H01S 3/0071* (2013.01); *G02B 27/123* (2013.01); *H01S 3/0014* (2013.01); *H01S 3/094076* (2013.01); *H01S 3/2383* (2013.01); *H01S 3/067* (2013.01); *H01S 3/094061* (2013.01)

(58) Field of Classification Search
CPC ................ H01S 3/0071; H01S 3/0014; H01S 3/094076; H01S 3/2383; H01S 3/067; H01S 3/094061; G02B 27/123
See application file for complete search history.

(56) References Cited

U.S. PATENT DOCUMENTS

| | | | | |
|---|---|---|---|---|
| 6,597,836 B2* | 7/2003 | Johnson | ............... | G02B 27/144 |
| | | | | 385/33 |
| 7,058,277 B1* | 6/2006 | Harkrider | .............. | G02B 26/08 |
| | | | | 385/32 |
| 8,605,761 B2* | 12/2013 | Hutchin | .................. | G01W 1/00 |
| | | | | 372/29.023 |

\* cited by examiner

*Primary Examiner* — Bao Q Truong
(74) *Attorney, Agent, or Firm* — Rivka Friedman

(57) ABSTRACT

A CBC system includes an array of beam sources generating coherent beams directed towards a target. The beam sources have associated adjustable phase modulators and beam steering arrangements. For each of the beams in a subset of the beams, the corresponding beam steering arrangement is actuated to steer the beam, and the corresponding phase modulator is actuated to modulate a current phase of the beam between at least three phase states. A detector monitors an intensity parameter that varies as a function of an intensity of radiation impinging on the target. A controller calculates, for each of the beams in the subset, a current value that is representative of a relative intensity of the beam based at least in part on the monitored intensity parameter at each of the at least three phase states. The calculated value is indicative of a current position of the beam relative to the target.

20 Claims, 7 Drawing Sheets

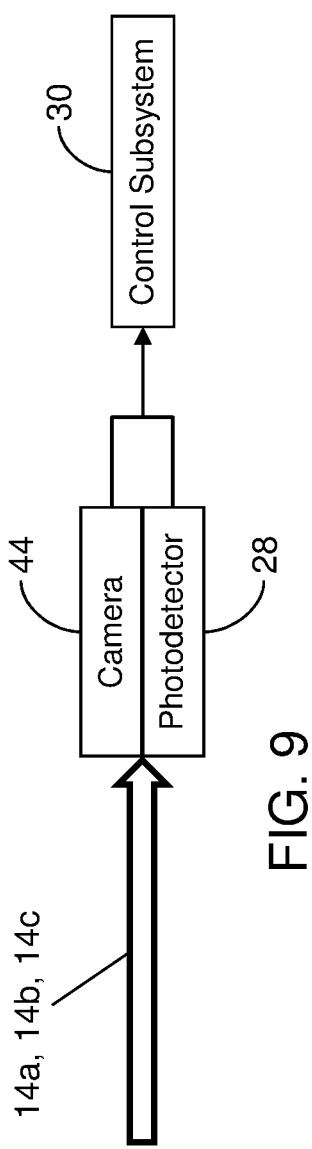
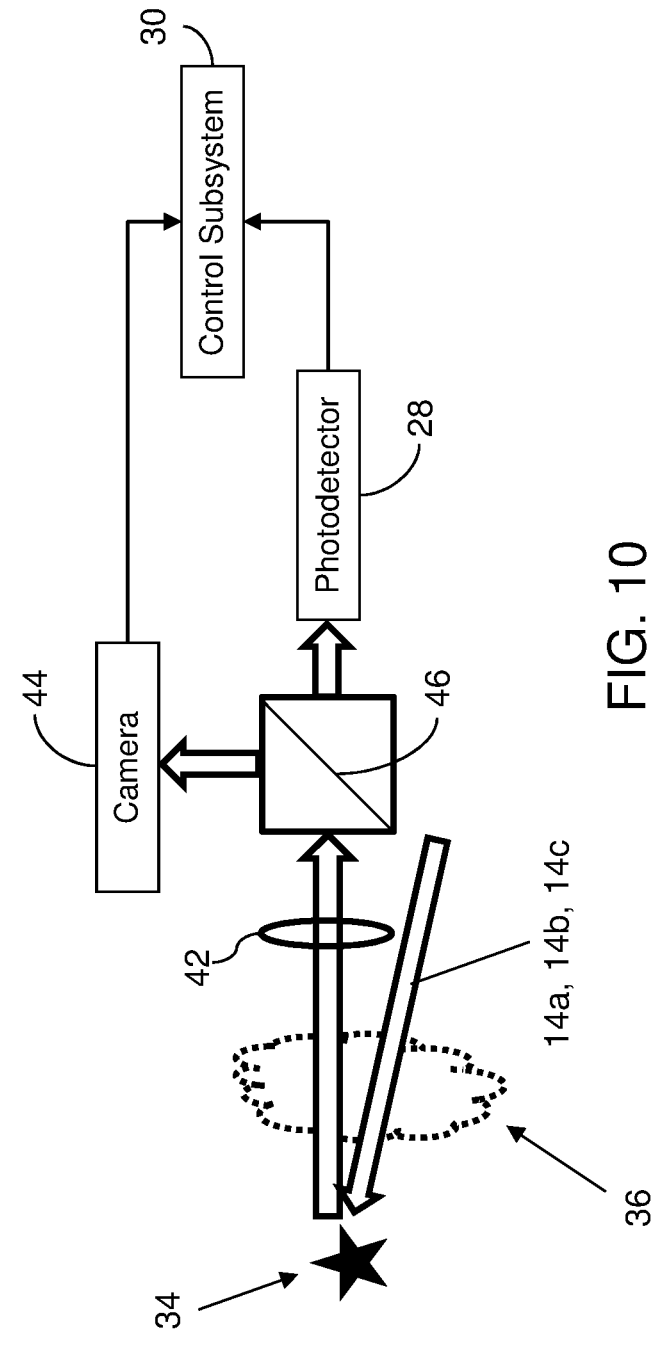

SYSTEM AND METHOD FOR ALIGNMENT OF BEAMS OF COHERENT BEAM ARRAY

TECHNICAL FIELD

The present invention relates to Coherent Beam Combination (CBC) systems.

BACKGROUND OF THE INVENTION

It is known to employ CBC systems in which a plurality of coherent laser beams are combined in order to achieve power scaling of a laser source. Typical implementations employ an array of fiber lasers, each seeded by a common "seeder" oscillator, which generate beams which are directed so as to combine at or before reaching a target.

In order to achieve effective coherent combination and a small-sized combined beam spot on the target, the phase of the different beams reaching the target must be very accurately synchronized so as to minimize phase differences between the beams. In addition, the effectiveness of CBC systems requires precise alignment (e.g., on the scale of a few micro radians) of the different beams on the same target spot so as to maximize the overlap between the beams. Some conventional techniques for achieving precise beam alignment have relied on switching on an individual beam and aligning that beam using a detector and imaging system combination. However, such techniques require sequential on/off switching of the beams, thereby reducing the operational effectiveness of the CBC system. Furthermore, since alignment requires switching off the beams, alignment errors that occur during the engagement time on the target cannot be corrected using such techniques. Other conventional techniques have relied on iterative optimization over a large number of degrees of freedom, such as stochastic parallel gradient descent. However, these techniques have very long convergence times making them impractical for use in dynamically varying operating conditions.

SUMMARY OF THE INVENTION

The present invention is a system and method for aligning beams of a coherent beam array.

According to the teachings of an embodiment of the present invention, there is provided a method for aligning beams of a coherent beam combination (CBC) device directed towards a target, the beams having associated adjustable phase modulators and beam steering arrangements, the method comprising: (a) for each of the beams in a subset of the beams, actuating the corresponding beam steering arrangement to steer the beam; (b) for each of the beams in the subset, actuating the corresponding phase modulator to modulate a current phase of the beam between at least three phase states; (c) monitoring an intensity parameter that varies as a function of an intensity of radiation impinging on the target; and (d) calculating, for each of the beams in the subset, a current value representative of a relative intensity of the beam based at least in part on the monitored intensity parameter at each of the at least three phase states, the calculated value being indicative of a current position of the beam relative to the target.

Optionally, the method further comprises: (e) for each of the beams in the subset, adjusting a beam pointing direction of the beam in accordance with the calculated current value.

Optionally, the method further comprises: (e) for each of the beams in the subset, forming a comparison metric based on the calculated current value and at least one preceding value representative of the relative intensity associated with the beam; and (f) if the comparison metric satisfies a threshold criterion, (i) storing the calculated current value, and (ii) keeping the beam steered to the current position.

Optionally, the method further comprises: (g) if the comparison metric fails to satisfy the threshold criterion, actuating the beam steering arrangement of the beam to steer the beam to a previous steering position.

Optionally, the method further comprises: (g) selecting a next subset of the beams; and (h) repeating (a)-(g).

Optionally, the calculating the current value is performed by evaluating an objective function having input based on the monitored intensity parameter at each of the at least three phase states.

Optionally, for each beam, the objective function has a single maximum that is achieved when the beam is positioned so as to be centered on the target.

Optionally, the intensity parameter is derived from a sensor sensitive to the beams located at the target.

Optionally, the intensity parameter is derived from a sensor deployed to sense radiation that is reflected from the target.

Optionally, for each of the beams in the subset the current value is representative of the relative intensity of the beam relative to the sum of all of the beams in the subset.

Optionally, the beams include at least 10 beams.

Optionally, the current phase of each of the beams is modulated in a stepped manner between the at least three phase states.

Optionally, the current phase of each of the beams is modulated in a substantially continuous manner over a range of modulation frequencies encompassing the at least three phase states.

Optionally, the current phase of each of the beams is modulated sinusoidally over a range of modulation frequencies encompassing the at least three phase states.

Optionally, the current phases of a plurality of the beams are varied sequentially.

Optionally, the subset is a majority subset.

Optionally, the subset includes all of the beams.

Optionally, the subset is a minority subset.

Optionally, the beams in the subset are steered in a random or pseudo-random fashion.

There is also provided according to the teachings of an embodiment of the present invention, a system comprising: (a) an array of beam sources configured to generate a plurality of coherent beams for directing towards a target; (b) a plurality of adjustable phase modulators associated with the beam sources so as to allow adjustment of relative phase offsets of the beams; (c) a plurality of beam steering arrangements associated with the array of beam sources configured to steer the coherent beams; (d) a detector deployed for monitoring an intensity parameter that varies as a function of an intensity of radiation impinging on the target; and (e) a control subsystem associated with the detector to receive the intensity parameter, the control subsystem further associated with the phase modulators and the beam steering arrangement, the control subsystem configured to: (i) actuate the beam steering arrangements associated with a subset of the beam sources to steer the beams generated by the beam sources in the subset, (ii) for each of the beams in the subset, actuate the corresponding phase modulator to modulate a current phase of the beam between at least three phase states, and (iii) calculate, for each of the beams in the subset, a current value representative of a relative intensity of the beam based at least in part on the monitored intensity parameter at each of the at least three phase states, the calculated value being indicative of a current position of the beam relative to the target.

Optionally, the control subsystem is further configured to: (iv) for each of the beams in the subset, actuate the corresponding beam steering arrangement to adjust a beam pointing direction of the beam in accordance with the calculated current value.

Optionally, the control subsystem is further configured to: (iv) for each of the beams in the subset, form a comparison metric based on the calculated current value representative of the relative intensity of the beam and at least one preceding value representative of the relative intensity value associated with the beam; and (v) if the comparison metric satisfies a threshold criterion, (1) store the calculated current value, and (2) keep the beam steered to the position.

Optionally, the control subsystem is further configured to: (vi) if the comparison metric fails to satisfy the threshold criterion, actuating the beam steering arrangement of the beam to steer the beam to a previous steering position.

Optionally, the control subsystem is further configured to: (vi) select a next subset of the beams, and (vii) repeat (i)-(vi).

Optionally, the control subsystem is configured to calculate the current value by evaluating an objective function having input based on the monitored intensity parameter at each of the at least three phase states.

Optionally, for each beam, the objective function has a single maximum that is achieved when the beam is positioned so as to be centered on the target.

Optionally, the detector is deployed at the target.

Optionally, the detector is deployed to sense radiation that is reflected from the target.

Optionally, for each of the beams in the subset the current value is representative of the relative intensity of the beam relative to the sum of all of the beams in the subset.

Optionally, the array of beam sources includes at least 10 beam sources.

Optionally, the current phase of each of the beams is modulated in a stepped manner between the at least three phase states.

Optionally, the current phase of each of the beams is modulated in a substantially continuous manner over a range of modulation frequencies encompassing the at least three phase states.

Optionally, the current phase of each of the beams is modulated sinusoidally over a range of modulation frequencies encompassing the at least three phase states.

Optionally, the current phases of a plurality of the beams are varied sequentially.

Optionally, the subset is a majority subset.

Optionally, the subset includes all of the beam sources.

Optionally, the subset is a minority subset.

Optionally, the control subsystem is configured to actuate the beam steering arrangements to steer the beams in the subset in a random or pseudo-random fashion.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 9 is a schematic representation of a photodetector for sensing radiation at the target and operating with an imaging system, according to the teachings of an implementation of the present invention; and FIG. 10 is a schematic representation of a photodetector for sensing radiation reflected from the target and operating with an imaging system, according to the teachings of a variant implementation of the present invention.

DESCRIPTION OF THE PREFERRED EMBODIMENTS

Figure 1:
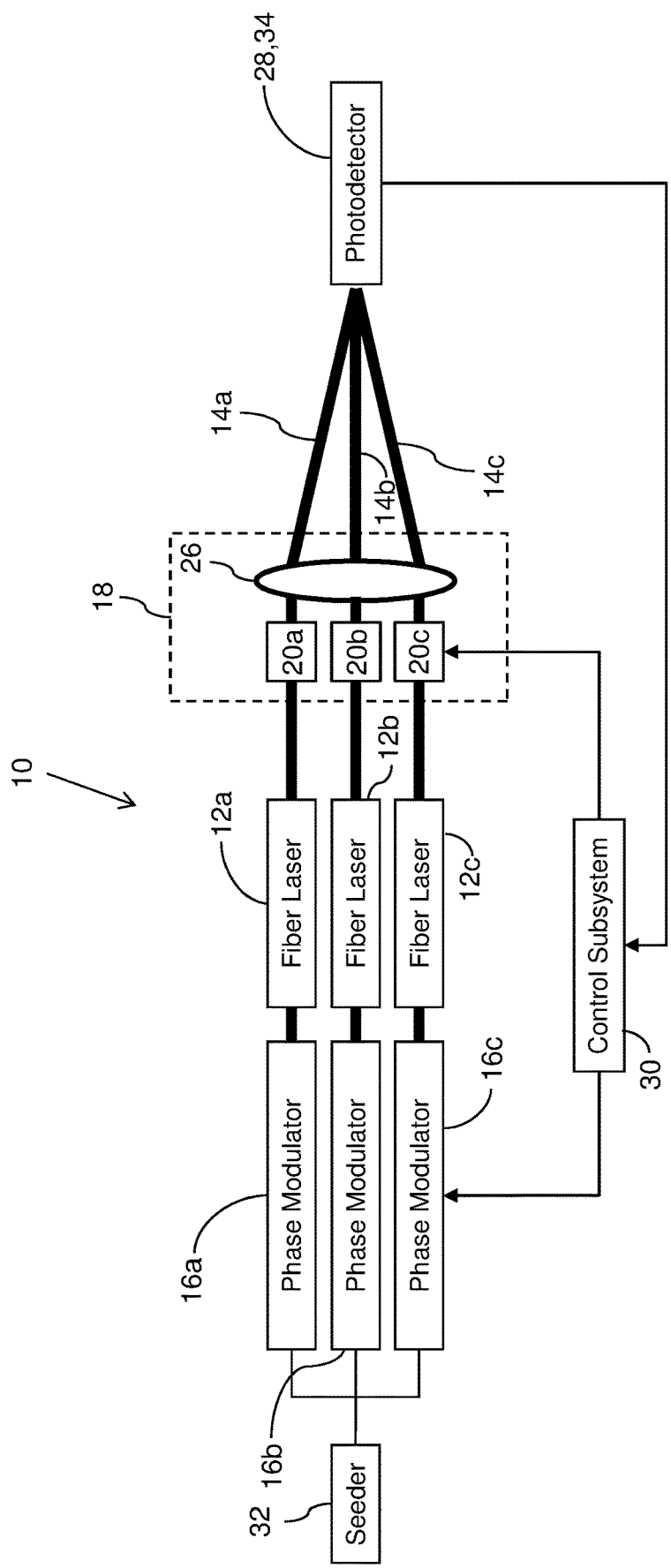
FIG. 1 is a schematic representation of a coherent beam combination system, constructed and operative according to the teachings of an implementation of the present invention, for aligning coherent beams on a target using a beam director and based on radiation sensed at the target.

The present invention is a system and method for aligning beams of a coherent beam array.

The principles and operation of the system and method according to present invention may be better understood with reference to the drawings accompanying the description.

The system and method according to the present invention is of particular value when applied within the context of high-energy laser or directed-energy weapons systems.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Referring now to the drawings, FIGS. 1-4 illustrate various implementations of a coherent beam combination (CBC) system/device (referred to hereinafter as "the system"), generally designated 10, constructed and operative according to certain non-limiting embodiments of the present disclosure. In general terms, the system 10 includes an array of beam sources 12a, 12b and 12c configured to generate a plurality of coherent beams 14a, 14b and 14c (also referred to as "sub-beams") for directing towards a target 34. A plurality of adjustable phase modulators 16a, 16b and 16c are associated with respective beam sources 12a, 12b and 12c so as to allow adjustment of relative phase offsets of the beams. Although only three beam sources and phase modulators are illustrated here for simplicity of presentation, the embodiments of the present disclosure are most preferably implemented with an array containing anywhere between two and a few hundred beams, and is most typically implemented with at least 10 beam sources, and in some particularly preferred cases, in the range of 20-100 beam sources. The phase modulators are typically provided one-per-source, although it will be appreciated that one of the sources may be implemented as a fixed reference phase without adjustment, and the rest of the beams and phase offsets may be measured and/or adjusted relative to that reference phase. A plurality of beam steering arrangements 20a, 20b and 20c, represented schematically in FIG. 1 as "black boxes", are associated with respective beam sources 12a, 12b and 12c so as to allow beam steering by way of adjustment of at least one beam pointing parameter associated with a pointing vector of the beams. A detector 28 (e.g., a photodetector) is deployed for monitoring an intensity parameter that varies as a function of an intensity of the radiation impinging on an area of the target 34. Optionally, the detector 28 may be integrated or in cooperation with an imaging system used for aiming the system 10. The imaging system is not illustrated here, but a non-limiting example of a detector configuration with an imaging system will be described with reference to FIGS. 9 and 10.

A control subsystem (also referred to as a "controller") 30, including logic circuitry, is associated with the detector 28 to receive the monitored (measured) intensity parameter, and is further associated with the adjustable phase modulators 16a, 16b and 16c and with the beam steering arrangements 20a, 20b and 20c to control phase adjustment of the beams and the beam pointing parameter(s) of the beams, respectively. The arrow-terminated lead lines from the control subsystem 30 to the phase modulator 16c and the beam steering arrangement 20c are representative of the functional association of all of the adjustable phase modulators 16a, 16b and 16c with the control subsystem 30, and of all of the beam steering arrangements 20a, 20b and 20c with the control subsystem 30.

In certain preferred embodiments, the association between the control subsystem 30 and the detector 28 is provided by a low-latency link (i.e., a link that can provide a latency of preferably no more than 1 millisecond). The low-latency link may be embodied, for example, as a low-latency data link or as a low-latency communication link of a communication network, including, for example, a wired network, an optical fiber connection, or a free space optical communication network.

It will be understood that various details of the implementation will vary considerably according to the intended application of the device. The variety of applications may extend from a low-energy research tool for measuring high-speed variations in optical properties of turbulent media through various communications applications (medium energy) up to high-energy directed-energy weapon systems. In each case, the array of beam sources 12a, 12b and 12c is most preferably an array of fiber lasers, seeded by a common seeder oscillator 32. For high energy applications, each fiber laser is preferably rated for a power output of at least 100 W, and in certain cases at least 1 kW. The principles of the present disclosure may be used for devices operating with various different wavelengths, but is typically implemented in the near-infrared (NIR) range. Seeder oscillators and fiber lasers suitable for operating in these ranges are well known in the art, and are readily commercially available.

The phase modulators 16a, 16b and 16c may be any type of phase modulator with suitable response times and low attenuation. The phase modulators are positioned after splitting the seeder 32, but preferably before the fiber laser amplifiers in order to operate with a relatively low-power signal. Suitable phase modulators are available commercially. One suitable non-limiting example is a 10 GHZ titanium indiffused Z-Cut LiNbO3 phase modulator identified by model no. LN53S-FC commercially available from Thorlabs, NJ (USA).

A beam directing arrangement (referred to interchangeably as a "beam director") 18 directs the beams 14a, 14b and 14c towards the target 34 or, for a large target, towards a particular region of the target, such that the beams 14a, 14b and 14c coherently combine (constructively interfere), at or before reaching the target 34. Within the context of this document, coherent beams that are combined at or before reaching a target generally refers to coherent beams that are either brought into coherent combination at the target, or are brought into coherent combination before the target and sustain coherent combination over the remaining distance to the target.

The term "target" is used here broadly to refer to the object against which the beams are to impinge, which may be a receiver (such as the detector 28) for communications applications or a target in the military sense for weapon applications. The structure and deployment of the detector 28 depends on the details of the application. In cases where the target forms part of the system design (e.g., for communications applications, research applications, and the like), the detector 28 is deployed to receive and sense radiation (coherent beams 14a, 14b and 14c) emitted by the beam sources 12a, 12b and 12c, and is configured to generate a signal (intensity parameter) indicative of an intensity of the radiation impinging on the detector 28. FIG. 1 illustrates a non-limiting example configuration in which the target 34 is a "cooperative target", i.e., the "target" is part of the system 10, and is provided with a target-mounted photodetector 28. In such cooperative configurations the detector 28 itself may be considered as the "target".

Figure 2:
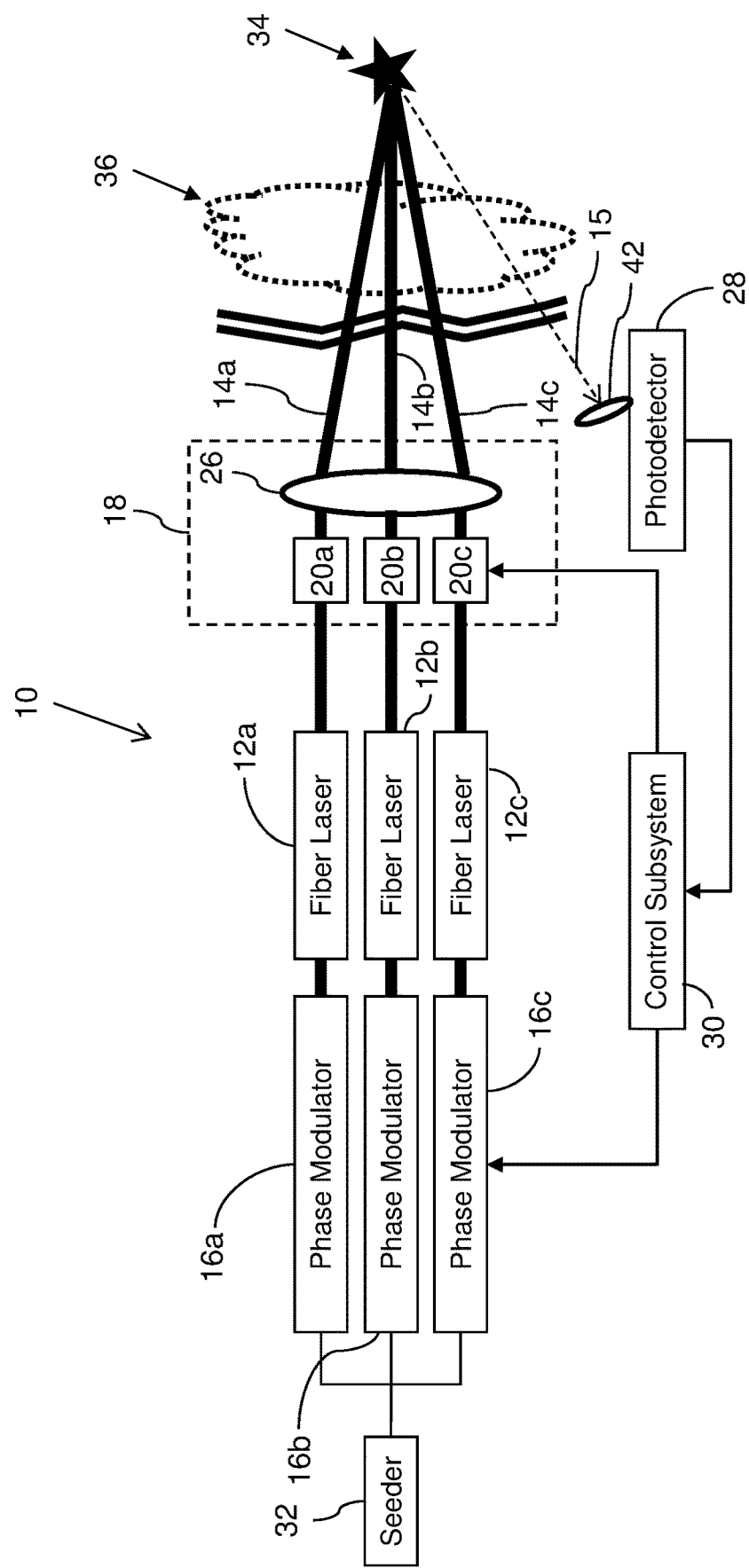
FIG. 2 is a schematic representation of a coherent beam combination system, constructed and operative according to the teachings of a variant implementation of the present invention, for aligning coherent beams on a target using a beam director and based on radiation reflected from the target.

In cases where the target is a remote object which does not form part of the system design, the detector 28 is deployed to sense radiation that is reflected from the target 34. FIG. 2 illustrates a non-limiting example configuration in which the target 34 is a "non-cooperative" target, i.e., the "target" is not part of the system 10 and is not required to carry any sensor or to play any active role in operation of the system. Here, a part of the radiation impinging on the target 34 is reflected (illustrated as reflected radiation 15) toward an optical arrangement 42 and delivered to the detector 28, which generates a signal (intensity parameter) indicative of an intensity of the radiation impinging on an area of target 34. The detector 28 and the optical arrangement 42 together form a "receiver" that receives target-reflected radiation 15. In order to ensure that the photodetector 28 measures the correct radiation, the optical arrangement 42, typically in the form of a receiver telescope, is deployed to define a field of view corresponding to the region from which the reflected radiation will arrive. The optical arrangement is represented schematically in FIG. 2 by a lens 42, but is typically an assembly of lenses, which may be refractive or reflective, or any combination thereof, to form an appropriate telescope, as is known in the art. A narrow passband filter (not shown) may advantageously be deployed in the optical path to selectively pass the reflected laser illumination to the detector 28 while excluding ambient background radiation, thereby enhancing the signal-to-noise ratio at the detector.

It is noted that in certain scenarios, in particular cases of long ranges to the target (either cooperative or non-cooperative), the beams 14a, 14b and 14c may be transmitted along an optical path that passes through an optically non-uniform and/or transiently varying medium, such as the atmosphere, towards the target. Such a case is illustrated in FIG. 2, in which the medium (generally designated 36) is represented schematically by a cloud-shaped object. It is noted that in other scenarios, for example shorter ranges to the target, such a medium 36 may not be present. Further note that although the beams 14a, 14b and 14c in the configuration illustrated in FIG. 1 are shown as being transmitted in the absence of an optically non-uniform and/or transiently varying medium, transmission conditions similar to those illustrated in FIG. 2 may also be applicable to the configuration illustrated in FIG. 1.

Figure 3:
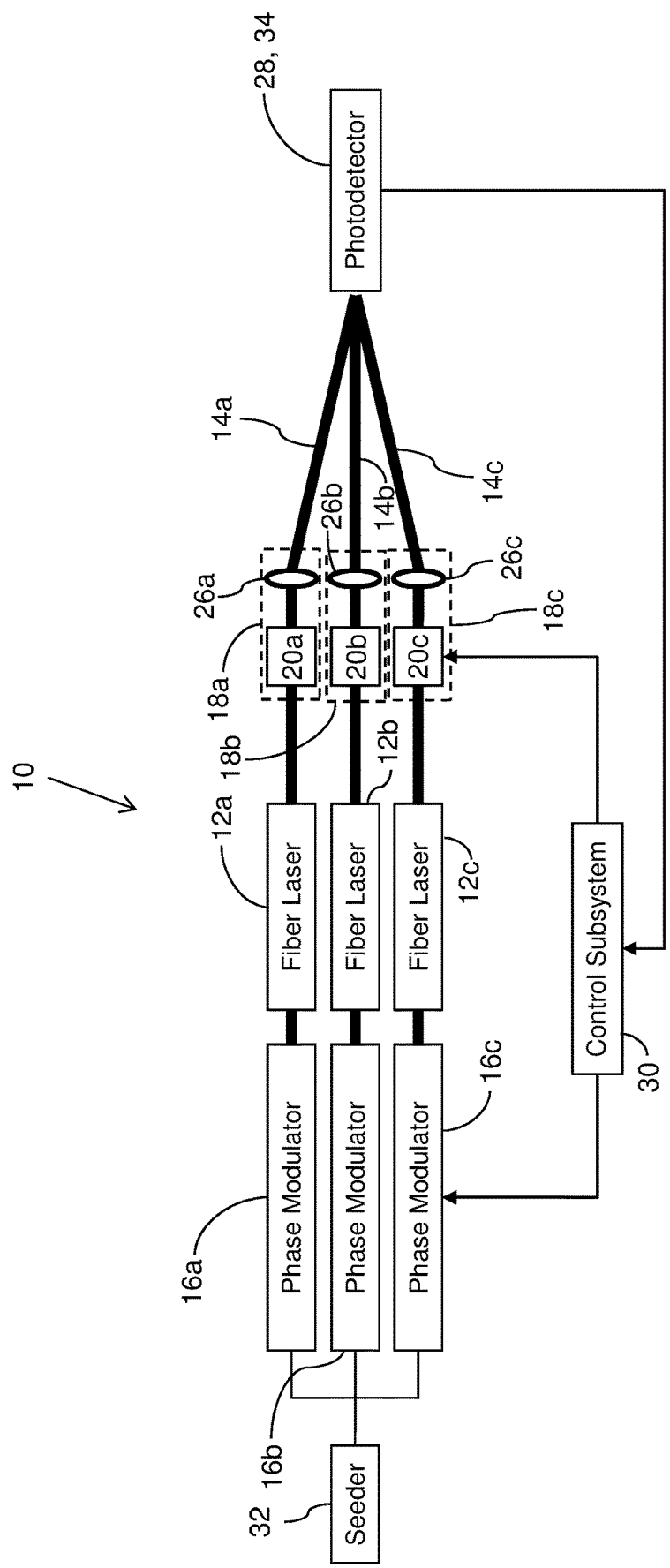
FIG. 3 is a schematic representation of a coherent beam combination system, similar to the system of FIG. 1, but in which each coherent beam has an associated beam director.
Figure 4:
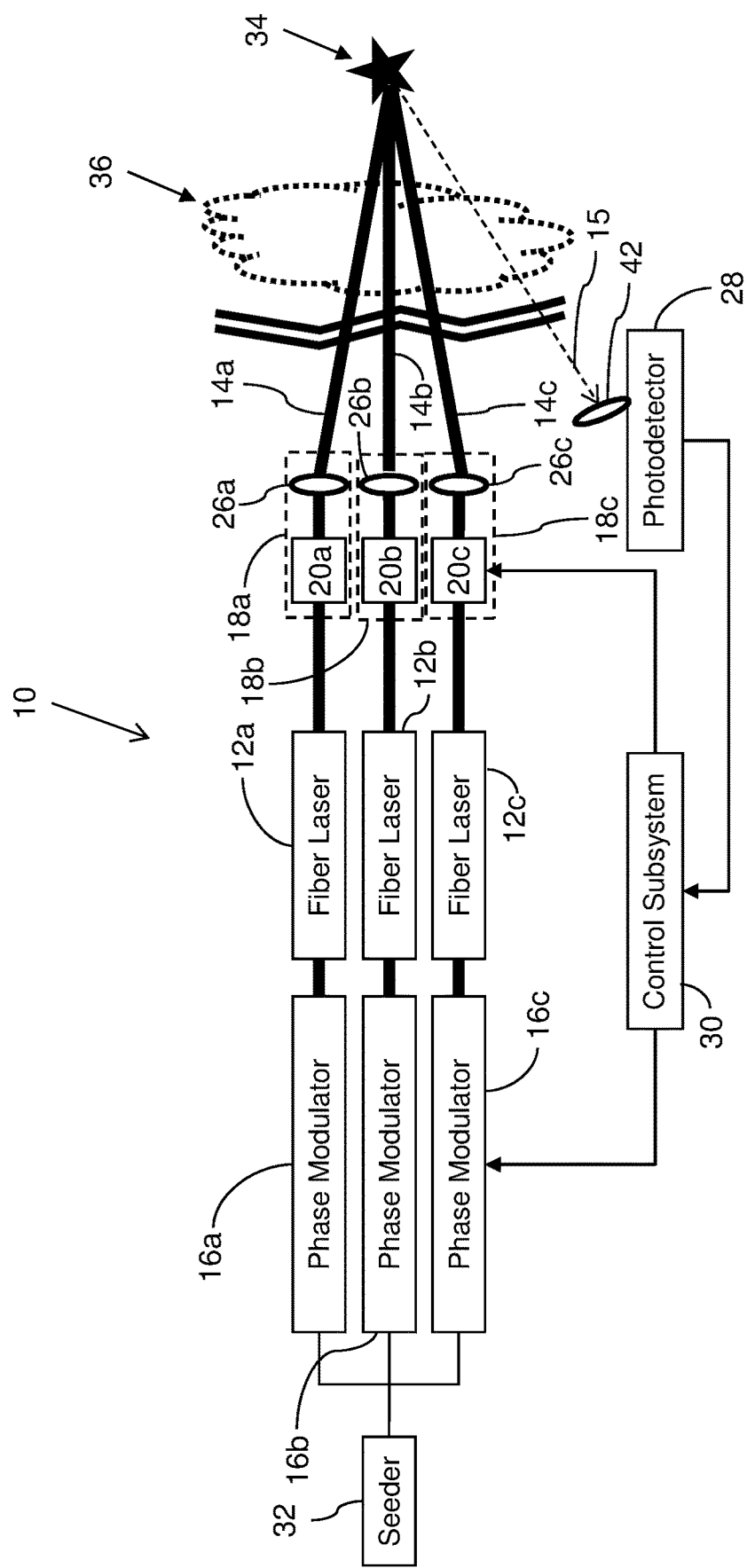
FIG. 4 is a schematic representation of a coherent beam combination system, similar to the system of FIG. 2, but in which each coherent beam has an associated beam director.

The beam director 18 includes the beam steering arrangements 20a, 20b and 20c, as well as an optics arrangement 26 (represented schematically in FIGS. 1 and 2 by a lens) for collimating and focusing the beams 14a, 14b and 14c. The optics arrangement 26, although shown here only schematically, typically includes a separate collimator for each beam, and common large-aperture focusing optics for directing the beams collectively towards the target. Alternatively, separate focusing optics can be provided for each beam. FIGS. 3 and 4 illustrate systems, generally similar to the systems of FIGS. 1 and 2, respectively, but in which separate collimating and focusing optics (designated 26a, 26b and 26c) are provided for each beam. Here, each beam source effectively has its own beam director (designated 18a, 18b and 18c), which provides a modular design of the beam source-beam director combination, leading to increased system flexibility and adaptability. It is noted, however, that other beam source-beam director implementation combinations are possible, for example implementations in which subsets of beam sources share common beam directing optics or some parts of the optical paths are shared and some are separated.

In preferred embodiments, each of the beam steering arrangements 20a, 20b and 20c, which in certain exemplary implementations is implemented as an opto-mechanical arrangement, includes beam steering optics (having at least one optical element) and at least one actuator that cooperate to adjust beam pointing parameters (azimuth and elevation angles) associated with a pointing vector of the sub-beams 14a, 14b and 14c so as to steer the beam in azimuth and/or elevation.

Figure 5:
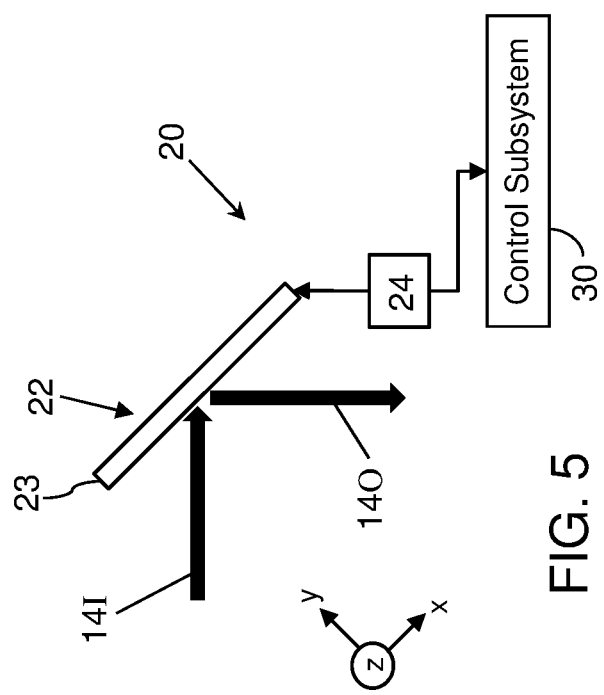
FIG. 5 is a schematic representation of a beam steering arrangement of the beam directors of FIGS. 1-4 according to the teachings of an implementation of the present invention.
Figure 6:
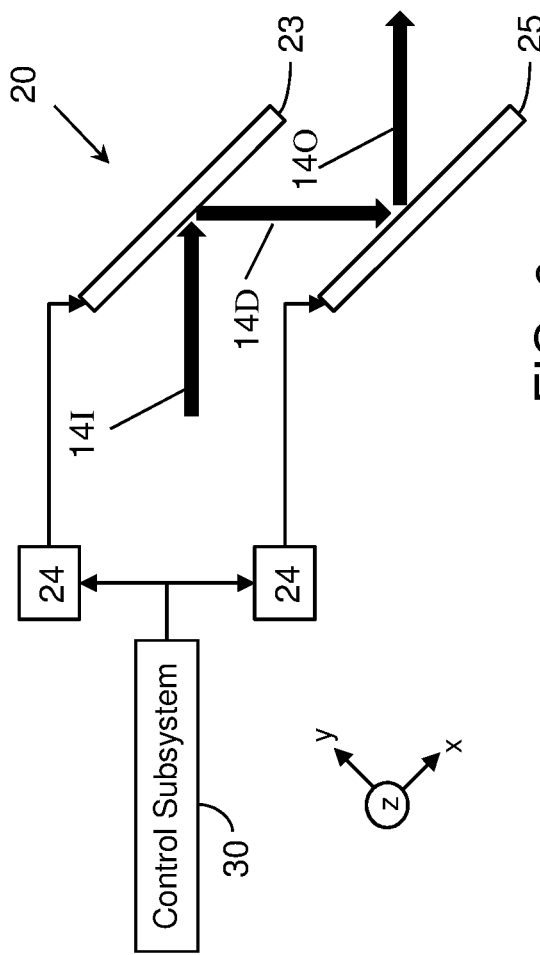
FIG. 6 is a schematic representation of a beam steering arrangement of the beam directors of FIGS. 1-4 according to the teachings of a variant implementation of the present invention.
Figure 7:
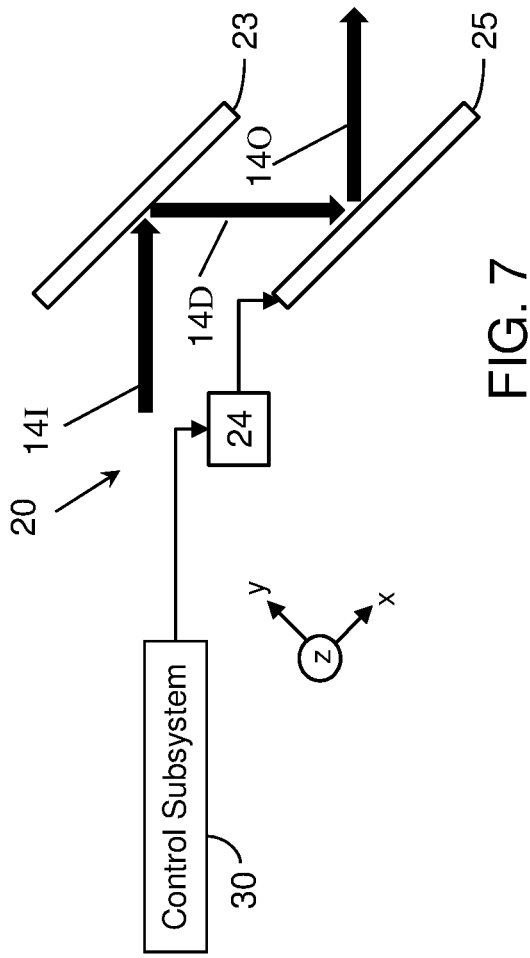
FIG. 7 is a schematic representation of a beam steering arrangement of the beam directors of FIGS. 1-4 according to the teachings of another variant implementation of the present invention.

FIGS. 5-7 schematically illustrate the details of a beam steering arrangement 20, which is representative of each of the beam steering arrangements 20a, 20b and 20c, according to various non-limiting implementations. As mentioned, the beam steering arrangement 20 includes beam steering optics 22 (having at least one optical element) coupled to at least one actuator 24 that is coupled to the control subsystem 30. In general, the beam steering optics 22 and the actuator 24 can be implemented using any suitable optical beam steering technology including, but not limited to, MEMS actuated mirrors, magnetic actuated mirrors, and the like. FIG. 5 shows one example non-limiting implementation, in which the actuator 24 is a mechanical actuator, and the beam steering optics 22 includes an optical element 23 implemented as an adjustable steering mirror coupled to the mechanical actuator. The mechanical actuator is configured to selectively adjust the orientation and/or position of the steering mirror (for example via rotation about one or more axis of rotation, and/or translation) in response to received control input from the control subsystem 30, so as to selectively, and in certain cases independently, adjust the elevation and azimuth angle (beam pointing parameters) of the outgoing beam 14O in response to illumination by the incident beam 14I (where the incident beam 14I is the beam from the output of the corresponding beam source (e.g., fiber laser 12a), and the outgoing beam 14O is the deflected beam (e.g., beam 14a) that is directed to optics arrangement 26 for directing towards the target 34). For example, rotation of the steering mirror about a first axis of rotation (illustrated arbitrarily herein as corresponding to the "x-axis") may be used to adjust the elevation angle of the outgoing beam, whereas rotation of the steering mirror about a second axis of rotation (illustrated arbitrarily herein as corresponding to the "z-axis") orthogonal to the first axis may be used to adjust the azimuth angle of the outgoing beam. The steering mirror is preferably fully reflective to light in the spectrum of the beam (e.g., the NIR range).

FIG. 6 shows another non-limiting implementation, in which the beam steering optics 22 includes a pair of optical elements 23, 25 each coupled to a respective actuator 24. Here, the optical elements 23, 25 are implemented as a pair of independently controllable and adjustable steering mirrors (which are coupled to separate mechanical actuators), where one of the actuators 24 (in response to received control input from the control subsystem 30) adjusts the orientation and/or position of the steering mirror 23, for example via rotation about a first axis of rotation (e.g., the arbitrarily labeled "x-axis" or "z-axis"), so as to control the elevation or azimuth angle of the beam and deflect the incident beam 14I toward the other steering mirror 25 as deflected beam 14D. Another one of the actuators 24 (in response to received control input from the control subsystem 30) adjusts the orientation and/or position of the steering mirror 25, for example via rotation about a second axis of rotation (e.g., the arbitrarily labeled "z-axis" or "x-axis"), so as to control the azimuth or elevation angle of the outgoing beam 14O in response to illumination by the deflected beam 14D. FIG. 7 shows yet another non-limiting implementation, similar to that of FIG. 6, but in which one of the optical elements 23 is implemented as a fixed mirror that deflects incident radiation to the other optical element 25, implemented as an adjustable steering mirror coupled to actuator 24. Here, the adjustable steering mirror 25 is independently rotatable about two orthogonal axes of rotation (illustrated arbitrarily herein as corresponding to the "x-axis" and the "z-axis") so as to enable independent adjustment of the elevation and azimuth angle of the beam pointing vector.

Although FIGS. 5-7 schematically illustrate beam steering optics 22 implemented as one or more steering mirrors, other implementations are contemplated herein, including, for example, implementations in which a steering prism is used instead of a steering mirror. The steering prism can control the elevation and azimuth angles of the outgoing beam via rotation of the prism about one or more axis of rotation. In such implementations, the reflective surface of the prism which controls the outgoing beam angles is preferably fully reflective to light in the spectrum of the beam. If implemented as a cuboid prism, or any other type of prism having external surfaces within which the reflective surface is deployed, the external surfaces are preferably formed from a light-transmissive material that is transparent to light in the spectrum of the beam. Wedge prisms are particularly useful for beam steering applications, such as those available from Thorlabs of Newton, NJ. Other beam steering implementations are also contemplated herein, including implementations that employ fiber motion independently along orthogonal axes to independently control azimuth and elevation. Non-mechanical beam steering implementations, for example acousto-optic deflectors, such as those available from Ilminster Somerset, UK, can also be used. However, acousto-optic deflectors, while having the advantage of providing high-speed beam steering capability, often results in significant optical losses in the optical path to the target, making such deflectors less suitable for high energy applications.

Regardless of the implementation, the actuator/s 24 is/are coupled to the control subsystem 30 (via, for example, an electronic link) and is/are configured to receive control input (control signals) from the control subsystem 30. The control subsystem 30 provides the actuator/s with control input (control signals) so as to control the actuator/s to adjust the orientation and/or position of the optical element (or elements) of the beam steering optics 22 so as to adjust the azimuth and/or elevation angles of the coherent beams, thereby adjusting the beam pointing vector for each beam.

The logic circuitry of control subsystem 30 may be implemented as suitably configured hardware using digital and/or analog processing, including but not limited to, one or more application-specific integrated circuit (ASIC), one or more field-programmable gate array (FPGA), as a general-purpose computing system configured by software operating under a suitable operating system, or by any hardware/software/firmware combination configured to perform the functions described herein at a suitable rate. The control subsystem 30 typically also includes a data storage device and suitable input and output interfaces for controlling the phase modulators and receiving inputs from the detector(s), all as will be clear to one having ordinary skill in the art. The data processing requirements of the system, even for high rates of measurement, are not unusual, and can be handled by standard processing equipment. Specialized hardware adaptation may be required due to the relatively large number of outputs (phase modulators for each beam) which must be adjusted rapidly in parallel, which exceeds the interface capabilities of most off-the-shelf hardware, but such adaptation is readily performed by a person having ordinary skill in the art using standard components.

It has been found that using intensity parameter measurements with a blind optimization approach (such as, for example, Stochastic Parallel Gradient Descent, or SPGD) to reduce beam misalignment (pointing vector adjustment) often have significant drawbacks which render such approaches impractical in various working conditions. For example, intensity variations caused by phase noise, atmospheric turbulence, and scintillations due to reflection from diffusive objects are generally on timescales similar to or higher than the speed of the steering elements 24, which can result in a signal-to-noise ratio that is too small (e.g., SNR<1 dB) to be used for pointing vector adjustment. Additionally, blind optimization techniques, such as SPGD, require a large number of iterative steps and therefore often converge too slowly to be effective. Instead, the system 10 according to embodiments of the present disclosure performs a deterministic (i.e., quantitative) measurement of the intensity parameter and uses those measurements to extract beam pointing error/misalignment information embedded in the phase information resulting from modulation of the current phase by the phase modulators 16a, 16b and 16c. In certain particularly preferred implementations, the deterministic measurements are used in combination with a beam model-based analysis in order to calculate, for each beam, a value that is representative of a relative intensity of the beam, whereby the calculated value is indicative of a position of the center of the beam relative to the target. In certain preferred embodiments, the calculated value is representative of the relative intensity of the beam relative to the sum of all the beams. The model-based analysis includes identifying or producing an objective function that is representative of the relative intensity, and that has a single maximum that is achieved when the center of the beam is centered on the target (or centered on the detector when the target is a cooperative target). The objective function is derived based on the analysis of the beam model, with the details of the analysis depending on the particular beam model and form of phase modulation introduced to the transmitted beams. As an outcome, the objective function takes as input the deterministic measurements resulting from the modulation of the current phase by the phase modulators 16a, 16b and 16c, and is repeatedly evaluated (by the control subsystem 30) while adjusting the beam pointing vectors in an iterative manner throughout the engagement of the system 10 on the target or until a stopping condition is reached, for example, until the beam pointing error is within an acceptable tolerance or the calculated representative relative intensity (via evaluation of the objective function) is of a sufficient intensity level.

In certain non-limiting exemplary implementations, the control subsystem 30 may employ a Gaussian beam as the beam model. Here, the intensity, I(r), of the coherently combined beams on the target 34 (or the detector 28 as in the case of FIGS. 1 and 3) can be expressed by the following equation:

$$I(r) = \left| \sum_{i=1}^{N} E_i e^{-\frac{(r-r_i)^2}{\sigma^2}} e^{-j\varphi_i(r)} \right|^2 \quad (1)$$

where N is the total number of beams (N=3 in the FIG. 1), $E_i$ is the electric field intensity of the $i^{th}$ beam, $r_i$ is the position of the center of the $i^{th}$ beam (given in three-dimensional space or as a three-dimensional vector), $\sigma$ is the radius of the beam at which the electric field amplitude falls to 1/e of the value along the beam propagation direction, r is the position of the target 34 (given in three-dimensional space or as a three-dimensional vector), $\varphi_i$ is the phase of the $i^{th}$ beam, and j is complex constant $\sqrt{-1}$.

For simplicity, the dependency on r in equation (1) can be removed if the target 34 (or the detector 28 as in the case of FIGS. 1 and 3) is assumed to be sufficiently small and positioned at the origin, i.e., if r=0. Using these assumptions, the expression in equation (1) can be reduced as:

$$I = \left| \sum_{i=1}^{N} E_i e^{-\frac{(r_i)^2}{\sigma^2}} e^{-j\varphi_i} \right|^2 \quad (2)$$

The intensity I achieves a maximum when both the phase differences between the beams is minimized (preferably 0), and each of the beams (e.g., sub-beams 14a, 14b and 14c) is centered on the target 34, i.e., when $r_i$=0 for all i=1 ... N. It has been shown that the modulation resulting from modulation of the current phase by the phase modulators 16a, 16b and 16c can be used in order to correct for phase offsets between multiple beams of the CBC system 10. In one particularly relevant example, the aforementioned intensity parameter, varying as a function of the radiation intensity impinging on the target 34, is monitored (measured) by the detector 28 while each phase modulator is actuated to modulate a current phase of the corresponding transmitted beam between at least three phase states, typically an initial "unmodified" phase state and two modified-phase states. The monitoring of the intensity parameter typically includes generating, by the detector 28, an intensity signal indicative of the intensity of the radiation impinging on the target 34. The control subsystem 30 receives the monitored intensity parameter (i.e., the intensity signal) from the detector 28 and identifies variations in the monitored intensity parameter resulting from the modulation of the current phase of each transmitted beam relative to the sum of all the other beams. The control subsystem 30 then calculates (based on the identified variations) a phase offset of the current phase for each beam relative to a representative phase of the sum of all the other beams.

This process of modulating the phase of the sub-beams, identifying corresponding variations in the measured intensity parameter, calculating the phase offset of a sub-beam and correction of that phase offset are preferably repeated in rapid cycles, thereby correcting in real-time for dynamic variations in the operating conditions, which may result from fluctuations in the beam generating hardware or from fluctuating atmospheric conditions caused by atmospheric turbulence. Further details of this process of phase correction are discussed at length in WO 2020/016824 A1, which is hereby incorporated by reference in its entirety herein.

According to certain aspects of the present disclosure, beam pointing error and/or beam-center position information, embedded in the intensity parameter measurements, is ascertained by calculating for each beam a value that is representative of the relative intensity of the beam using the intensity parameter measurements (and in certain cases phase offset information) resulting from modulation of the current phase by the phase modulators 16a, 16b and 16c.

In certain implementations, the current phase of each transmitted beam is modulated at a modulation frequency. In certain particularly preferred implementations, the current phase of each transmitted beam is modulated stepwise between a base phase value (unmodified phase state) and at least two discrete modulated values (modified phase states). In other implementations, the current phase of each transmitted beam is modulated in a substantially continuous manner over a range of modulation frequencies encompassing the aforementioned at least three phase states.

According to one preferred but non-limiting example, the control subsystem 30 varies the phase of each beam (14a, 14b and 14c) stepwise, wherein discrete steps equivalent to a step function variation of the phase state may be used, for example by employing rectangular or square wave phase modulation, as is commonly used in square wave dithering techniques. Here, the modulation of the different beams is preferably performed sequentially so as to isolate the effect on the intensity measurements resultant from each modulation.

In one particularly preferred example, the phase of each beam is varied sequentially according to a discrete three-step modulation, where the phase modulator associated with each beam is configured to modulate the phase of the beam between its current base value (initial unmodified phase state) and two discrete modulated values (a first modified phase state (i.e., a first discrete modulated value) and a second modified phase state (i.e., a second discrete modulated value)). The phase values represent a phase offset of the current phase of each beam relative to a representative phase of the sum of all the other beams. At the initial unmodified phase state, the phase offset is effectively 0 (i.e., there is no phase offset of the current phase of the beam relative to representative phase of the sum of all the other beams). At the first modified phase state, i.e., when the phase assumes a first discrete modulated value, there is a positive phase offset or shift (say −δ) for the current phase of the beam relative to representative phase of the sum of all the other beams. At the second modified phase state, i.e., when the phase assumes a second discrete modulated value, there is a negative phase offset or shift (say −δ) for the current phase of the beam relative to representative phase of the sum of all the other beams. In certain cases, the phase offset values +/−δ are the actual discrete modulated values. However, in other cases, the phase offset values +/−δ may be calculated, for example using the techniques described in WO 2020/016824 A1.

When the control subsystem 30 actuates the phase modulator of the $i^{th}$ beam to modulate the phase $\varphi_i$ to vary between the three phase states, the control subsystem 30 actuates the remaining phase modulators to maintain the phases of all other beams (i.e., $\varphi_k$ for k=1 ... N, k≠i) at the unmodified (i.e., unshifted) phase state. The detector 28 measures the intensity parameter at the three phase states so as to generate three intensity signals, and in preferred implementations identifies variations in the intensity parameter resulting from the modulation. The detector 28 measures the intensity when the phase of the $i^{th}$ beam assumes the unmodified phase state (i.e., when the phases of all of the beams are unmodified/unshifted) so as to obtain a first intensity parameter measurement, designated $I_0$. The detector 28 measures the intensity when the phase of the $i^{th}$ beam assumes the first modified phase state (i.e., when the current phase $\varphi_i$ is shifted by +δ relative to the representative phase of the sum of all the other beams) so as to obtain a second intensity parameter measurement, designated $I(\varphi_i+\delta)$. The detector 28 measures the intensity when the phase of the $i^{th}$ beam assumes the second modified phase state (i.e., when the current phase $\varphi_i$ is shifted by −δ relative to the representative phase of the sum of all the other beams) so as to obtain a third intensity parameter measurement, designated $I(\varphi_i-\delta)$. The detector 28 is preferably synchronized with the phase modulators (via the control subsystem 30) such that the detector 28 performs the (at least) three intensity measurements at time intervals that coincide with the modulation intervals. Preferably the time between the three intensity measurements is on the order of a few microseconds, such that the total intensity measurement period required for making the three intensity parameter measurements is on the order of a few microseconds.

An intensity variation resulting from the modulation, denoted $I_+$, is obtained (e.g., calculated by the control subsystem 30) as the ratio between the intensity measurement $I(\varphi_i+\delta)$ (which is the intensity when the phases of all of the beams are unmodified expect for the phase $\varphi_i$, which is shifted by $+\delta$) and the intensity measurement $I_0$ (which is the intensity when the phases of all of the beams are unmodified). Another intensity variation resulting from the modulation, denoted $I_-$, is obtained (e.g., calculated by the control subsystem 30) as the ratio between the intensity measurement $I(\varphi_i-\delta)$ (which is the intensity when the phases of all of the beams are unmodified expect for the phase $\varphi_i$, which is shifted by $-\delta$) and the intensity measurement $I_0$ (which is the intensity when the phases of all of the beams are unmodified).

Using the Gaussian beam model, the relative intensity of the $i^{th}$ beam relative to the sum of all of the beams (with unmodified phases) can be expressed as:

$$\frac{E_i^2 e^{-2r_i^2/\sigma^2}}{I_0} \quad (3)$$

The expression in (3) can be derived by expanding equation (2)—which involves many inter-modulation product terms—and isolating the term that is solely dependent on i (i.e., ignoring all inter-modulation terms and all terms k≠i). An objective function, $F(\varphi_i,\delta)$, that interrelates the relative intensity of the beam in expression (3) and the intensity variations resulting from the modulation ($I_+$ and $I_-$) together with phase offset amount (i.e., modulation-level) $\delta$ can be derived by expanding equation (2), and is given as follows:

$$F(\varphi_i, \delta) = \frac{E_i^2 e^{-2r_i^2/\sigma^2}}{I_0} = \left(\frac{I_+ - I_-}{4\sin\delta}\right)^2 + \left(\frac{I_+ + I_- - 2}{4(1-\cos\delta)}\right)^2 \quad (4)$$

It is noted that the phase terms in all of the intermodulation products reduce down to phase differences between the phases of the various beams. With respect to the term $I(\varphi_i+\delta)$, the phase $\varphi_i+\delta$ represents the current phase of the $i^{th}$ beam shifted by $+\delta$ (in other words $\varphi_i+\delta$ is the current phase shifted by the offset $+\delta$ of the current phase relative to representative phase of the sum of all the other beams). Similarly, with respect to the term $I(\varphi_i-\delta)$, the phase $\varphi_i-\delta$ represents the current phase of the $i^{th}$ beam shifted by $-\delta$ (in other words $\varphi_i-\delta$ is the current phase shifted by the offset $-\delta$ of the current phase relative to representative phase of the sum of all the other beams).

The control subsystem 30, after obtaining the intensity variations resulting from the modulation ($I_+$ and $I_-$), performs a calculation using $\delta$, $I_+$ and $I_-$ as inputs so as to evaluate the objective function $F(\varphi_i,\delta)$. The objective function $F(\varphi_i,\delta)$ has a single maximum that is achieved when the beam is centered on the target 34 (i.e., when $r_i=0$). Therefore, the objective function F is representative of the relative intensity of the beam in expression (3), and is indicative of the position of the center of the beam relative to the target 34, and moreover is indicative of beam pointing error (i.e., beam misalignment). A non-maximal output value produced by evaluating the objective function $F(\varphi_i,\delta)$ indicates that the position of the center of the beam does not coincide with the center of the target 34, and therefore that there is an amount of beam pointing error in a certain direction. Although the objective function $F(\varphi_i,\delta)$ may not provide the direction in which the beam needs to be moved in order to correct the beam pointing error so as to achieve maximum beam intensity, it can be used as an optimization or merit function that can be repeatedly calculated/evaluated while adjusting the beam pointing vector until a stopping criterion, such as a pointing error performance threshold or a beam intensity threshold, is reached.

For example, if a low output value is produced upon evaluation of the objective functions of a subset of the beams by the control subsystem 30, the control subsystem 30 may actuate in parallel the beam steering arrangements that are associated with the subset (i.e., some or all) of the beams so as to adjust the beam pointing vector (i.e., adjust the azimuth and/or elevation angle of the beam) of the beams. The detector 28 may then perform new measurements of the intensity parameter at the three phase states after the beam pointing vectors are adjusted, and the control subsystem 30 may then obtain new intensity variations resulting from the modulation ($I_+$ and $I_-$) based on the new measurements performed by the detector 28, and re-evaluate the objective function $F(\varphi_i,\delta)$ using the new $I_+$ and $I_-$ for each sub-beam. This process of adjusting the beams pointing vectors, measuring the intensity parameter at the three phase states, and evaluating the objective function can be repeated iteratively in rapid cycles, thereby correcting in real-time for beam pointing error at a high rate of convergence. In various practical applications, rapid repetition of these cycles is performed repeatedly at least 100 times per second. The beam alignment process according to the teachings of the present disclosure relies on optimization that is performed separately for each beam. Thus, the optimization degrees of freedom of the various beams are uncorrelated thereby resulting in a reduction in the overall degrees of freedom in the optimization space as compared to previously contemplated blind optimization approaches (e.g., SPGD) in which the degrees of freedom are correlated resulting in a vast optimization space.

As should be understood, the above example of discrete three-step modulation can be extrapolated to M-step modulation for any integer M>2.

Although the embodiments described thus far have pertained to a particularly preferred non-limiting implementation in which the modulation is performed stepwise between a current base value and (at least) two discrete modulated values, other embodiments are possible in which the control subsystem 30 varies the current phase of the beams simultaneously in a substantially continuous manner over a range of modulation frequencies encompassing the aforementioned at least three phase states. Thus, for example, the current phase of a beam may be varied according to a sinusoidal modulation. Other continuous functions, such as saw-tooth variation, may be used. In one preferred non-limiting example, the control subsystem 30 varies the phase of each beam in a sinusoidal manner about a central phase state by a phase variation modulation amplitude $A_m$ at a modulation frequency $\omega$. If the amplitude of intensity variation occurring at the target at frequencies corresponding to the first two harmonics (frequencies $\omega$ and $2\omega$) are denoted $I_\omega$ and $I_{2\omega}$, the phase offset $\Phi_\omega$ of the central phase state of the beam modulated at frequency $\omega$ relative to the average phase is given by:

$$\Phi_\omega = \tan^{-1}\left(\frac{J_2(A_m)I_\omega}{J_1(A_m)I_{2\omega}}\right)$$

where $J_1$ and $J_2$ are Bessel functions of the first kind. In this case the objective function has the form:

$$F = E_i^2 e^{-2r_i^2/\sigma^2} \propto \left(\frac{I_\omega}{J_1(A_m)}\right)^2 + \left(\frac{I_{2\omega}}{J_2(A_m)}\right)^2 \quad (5)$$

Figure 8:
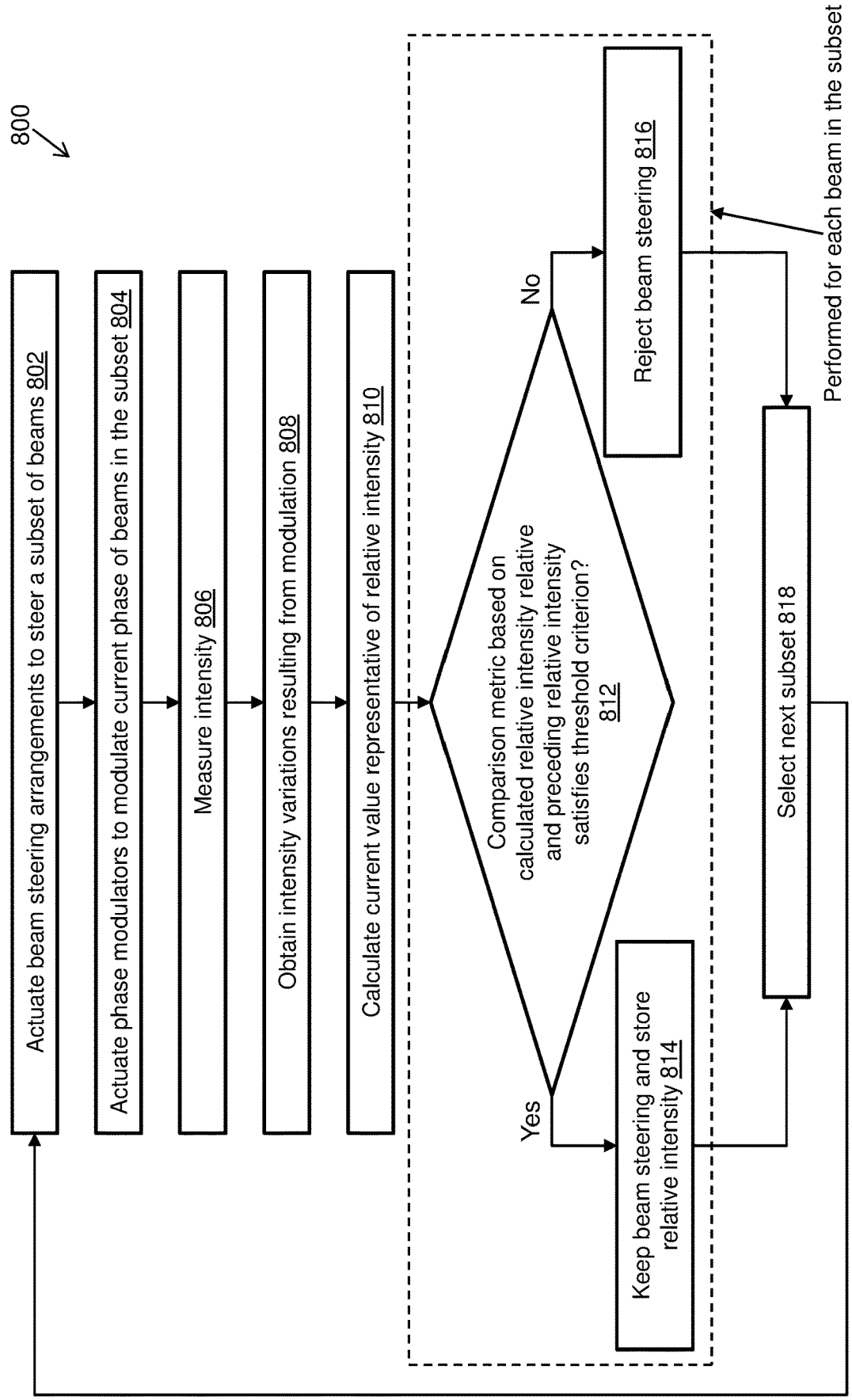
FIG. 8 is a flow diagram illustrating a process for aligning coherent beams on a target, according to the teachings of an implementation of the present invention.

Attention is now directed to FIG. 8 which shows a flow diagram detailing a process (method) 800 in accordance with embodiments of the disclosed subject matter. The process includes steps for aligning beams of the system 10 on a target by correcting/adjusting the beam pointing direction of each sub-beam in accordance with the value of the objective function of the sub-beam. Reference is also made to the elements shown in FIGS. 1-7. The process 800 and the steps (sub-processes) of FIG. 8 are performed by the system 10 and its associated components, including, for example, the phase modulators 16a, 16b and 16c, the beam steering arrangements 20a, 20b and 20c, the detector 28, and the control subsystem 30. The sub-processes of the process 800 are preferably performed automatically, and are preferably performed in real-time. The process 800 is an iterative process, by which the steps of the process 800 can be repeated, for example periodically or continuously throughout the engagement of the system 10 on the target, or for a set number of iterations or until a stopping criterion is met.

The process 800 begins at step 802, where the beam pointing vectors of a selected current subset (i.e., group) S of the beams are adjusted. The beams of the subset S can be selected randomly (by the control subsystem 30) or can be pre-selected by pre-programming the beams into a memory of the control subsystem 30. The adjustment is effectuated by the control subsystem 30 actuating the beam steering arrangements, associated with the beams in the subset S, to steer the beams by adjusting beam pointing parameters of the beams. As discussed, the actuation to adjust the beam pointing parameters (which define beam pointing vectors) may be effectuated by sending a control input to the actuator of the beam steering arrangement to adjust (via rotation about one or more axis of rotation) the position and/or orientation of beam steering optics so as to modify the azimuth and/or elevation angles of the beams. The beam pointing parameters (i.e., the defined beam pointing vectors) of the beams are preferably adjusted in a random, pseudo-random, or pre-determined fashion. For example, for each beam, the associated beam steering arrangement may adjust the azimuth and/or elevation angles by random or pseudo-random amounts that are preferably selected from within predefined azimuth and elevation ranges. Preferably, the adjustments of the azimuth/elevation angles of the steered beams are varied within the subset of beams in order to ensure that the center of the combined beam remains more or less in the same position.

It is noted that the process 800 may include an initialization step (not shown), prior to the first iteration (i.e., first execution of step 802) in which the control subsystem 30 selects the selected subset S of beams. In certain non-limiting implementations, the subset is the entire set of beams (i.e., the subset includes all of the beams). However, it is noted that utilizing the entire set of beams as the subset could result in situations in which all of the beams are steered such that the combined beam deviates from the target. Therefore, in more preferred non-limiting implementations, the subset is a majority subset (i.e., contains at least half of the beams but not all of the beams), which in certain cases contains at least 70% of the beams, and in other cases contains at least 80% of the beams, and yet in other cases contains at least 90% of the beams. In other non-limiting implementations, the subset is a minority subset (i.e., contains less than half of the total number of beams). In such minority subset implementations, the beams are preferably divided into equal groups such that each subset contains the same number of beams. For example, if there are 100 beams, the beams could be divided into five subsets (groups) of 20 beams each.

The process 800 then moves to step 804, where for each of the beams in S, the control subsystem 30 actuates the phase modulator corresponding to the beam to modulate the current phase of the beam between at least three phase states. In certain preferred but non-limiting implementations, the modulation of the different beams is discrete step modulation (encompassing modulation levels that result in phase shifts of $+\delta$ and $-\delta$) that is performed sequentially so as to isolate the effect on the intensity measurements resultant from each modulation. Accordingly, when using discrete step modulation, step 804 is broken into m sub-steps, where m is the number of beams in the subset S (i.e., m is size of S). When using continuous (e.g., sinusoidal) modulation, all of the beams in S can be modulated simultaneously, and frequency analysis (e.g., Fourier analysis) can be used to isolate the effect on the intensity measurements resultant from each modulation.

At step 806, the detector 28 measures intensity (in response to illumination by the beams) so as to obtain the intensity parameter measurements for the beams in S when the current phase of a beam is modulated between the (at least) three phase states. When using sequential discrete-step modulation, an intensity measurement is made for each discrete step (for each beam). In such cases, the detector 28 is preferably synchronized with the phase modulators (via the control subsystem 30) such that the detector 28 performs (at least) three intensity measurements for each beam S at time intervals that coincide with the modulation intervals for the beam so as to obtain the intensity parameter measurements $I_0$, $I(\varphi_i+\delta)$ and $I(\varphi_i-\delta)$. Specifically, for a given beam in S, the detector 28 measures the intensity parameter during the modulation interval at which the current phase of the given beam is modulated so as to assume a first modified phase state, e.g., phase offset of $+\delta$ so as to measure $I(\varphi_i+\delta)$, the detector 28 measures the intensity parameter during the modulation interval at which the current phase of the given beam is modulated so as to assume a second modified phase state, e.g., phase offset of $-\delta$ so as to measure $I(\varphi_i-\delta)$, and the detector 28 measures the intensity parameter during the modulation interval at which the current phase of the given beam is modulated so as to assume an unmodified phase state, e.g., no phase offset so as to measure $I_0$). When using continuous (e.g., sinusoidal) modulation, an intensity measurement is made for each modulation frequency.

At step 808, the intensity variations resulting from the modulation are obtained. In implementations using sequential discrete-step modulation, the intensity variations resulting from the modulation ($I_+$ and $I_-$) are obtained via calculation (by the control subsystem 30) based on the intensity parameter measurements $I_0$, $I(\varphi_i+\delta)$ and $I(\varphi_i-\delta)$. In implementations using continuous (e.g., sinusoidal) modulation in which the current phase is modulated continuously at a modulation frequency, the intensity variations resulting from the modulation are obtained by the control subsystem 30 identifying variations in the measured intensity resulting from the modulation occurring at more than one harmonic frequency of the modulation frequency. This may be the modulation frequency itself and the second harmonic (twice the modulation frequency). As mentioned, frequency analysis (e.g., Fourier analysis) can be used to isolate the intensity variations resultant from each modulation.

At step 810, the control subsystem 30 calculates (determines), for each beam in S, a current value that is representative of the relative intensity of the beam based at least in part on the monitored intensity parameter at each of the at least three phase states. In particular, the control subsystem 30 determines (calculates) the current value for a beam in S by evaluating the objective function for that beam using the intensity variations resulting from the modulation (obtained at step 808). The calculated current value, by being representative of the relative intensity, is also indicative of a current position of the center of the beam relative to the target (where the current position is defined by the beam steering vector of the beam). As mentioned, in certain preferred embodiments the calculated value is representative of the relative intensity of the beam relative to the sum of all the beams in S.

In non-limiting example implementations using sequential discrete-step modulation and assuming a Gaussian beam model, the objective function F can take $\delta$, $I_+$ and $I_-$ as inputs, as described above with reference to equation (4). In non-limiting example implementations using continuous (e.g., sinusoidal) modulation and assuming a Gaussian beam model, the objective function F can take $A_m$, $I_\omega$ and $I_{2\omega}$ as inputs, as described above with reference to equation (5).

If there are m beams in the subset, m objective functions are evaluated at step 810 to produce m values. The m objected functions can be evaluated, for example, in parallel, sequentially, or in groups. Typically, control subsystem 30 is able to complete the evaluation of the objective functions for all of the beams in the subset within a few hundred microseconds (or less if the subset is a small subset subset).

Turning now to steps 812-816, it is first noted that these steps 812-816 are performed for each beam in the subset S. However, for clarity and brevity the details of the steps 812-816 will only be described for a particular beam in the subset S. The performance of steps 812-816 for all of the beams in S can be performed, for example, in parallel, sequentially, or in groups.

At step 812, the control subsystem 30 performs a comparison based on the calculated current value (produced at step 810) and the immediately preceding value (and optionally one or more additional preceding values), in order to determine whether to accept the beam steering adjustment for the beam (performed at step 802) or reject the beam steering adjustment for the beam (performed at step 802). The immediately preceding value is the value that was calculated by the immediately preceding evaluation of the objective function for that beam (from the immediately preceding iteration of the process 800). The immediately preceding value can be a value retrieved from stored memory of the control subsystem 30 or stored memory electronically linked to the control system 30. Generally speaking, at step 812 the control subsystem 30 performs the comparison based on the current calculated value and the immediately preceding value (and optionally one or more additional preceding values) in order to form a comparison metric, and then determines whether the comparison metric satisfies a threshold criterion.

In one non-limiting example implementation, the control subsystem 30 applies proportional control at step 812 by comparing the calculated current value (produced at step 810) to the immediately preceding value. In this somewhat simplistic example implementation, the comparison metric is defined as the change between the current value and the immediately preceding value. If the current value is larger than the immediately preceding value (i.e., positive comparison metric), that is an indication that the beam steering adjustment for the beam (performed at step 802) decreased the alignment error of that beam (i.e., the beam steering adjustment performed at step 802 positioned the center of the beam closer to the center of the target).

In another non-limiting example, the control subsystem 30 applies derivative-based control at step 812 by comparing the rate of change in the calculated relative intensity. In such an implementation, the comparison metric is the rate of change of the calculated relative intensity, and is formed based on multiple preceding values. For example, at a given iteration i the control subsystem 30 calculates the change between the relative intensity calculated at iterations i and i−1, and compares that change to the change between the relative intensity calculated at iterations i−1 and i−2, in order to determine the rate of change in the calculated relative intensity. If the rate of change satisfies a threshold criterion, for example if the rate of change is larger than a certain value (which can be a fixed value, or can be a value that varies from iteration to iteration) that is an indication that the beam steering adjustment for the beam (performed at step 802) decreased the alignment error of that beam.

It is noted that if no immediately preceding value for a particular beam is available (for example if the steering adjustment performed at step 802 was the first steering adjustment of the beam in any subset), the current value can be compared to a default initial value, for example 0 or a value that is between the maximum achievable value and minimum achievable value of the objective function.

If at step 812 the comparison metric satisfies a threshold criterion, i.e., if the beam steering adjustment at step 802 decreased the alignment error, the process 800 moves from step 812 to step 814, where the control subsystem 30 accepts the beam steering adjustment for the beam (performed at step 802). For example, if using the simplistic proportional control example, if the current value is greater than the immediately preceding value (i.e., if the comparison metric is positive), the process 800 moves from step 812 to step 814. By accepting the beam steering adjustment, the beam is kept steered to the current beam pointing/steering position. In addition, the current value for the beam is stored (e.g., in memory of the control subsystem 30 or in memory linked to the control subsystem 30). The current value is stored such that the next iteration in which the same beam is steered, the stored current value will serve as the "immediately preceding value" for the comparison at step 812.

If the comparison performed at step 812 does not satisfy (i.e., fails to satisfy) the threshold criterion, i.e., if the beam steering adjustment at step 802 did not decrease alignment error, the process 800 moves from step 812 to step 816, where the control subsystem 30 rejects the beam steering adjustment for the beam (performed at step 802). For example, if using the simplistic proportional control example, if the current value is not greater than the immediately preceding value (i.e., if the comparison metric is negative), the process 800 moves from step 812 to step 816. In certain embodiments, the rejection at step 816 further includes the control subsystem 30 actuating the beam steering arrangement of the beam to steer the beam so as to revert back to the previous beam pointing position (i.e., the beam pointing (i.e., steering) position that the beam was in immediately prior to step 802). For example, consider a particular beam having a beam pointing vector that points toward a point P at the start of a given iteration. Using the simplistic proportional control example, if at step 802 the beam is steered such that the beam pointing vector of the beam points toward a point Q, and at step 812 the current value is determined to be less than the immediately preceding value, the control subsystem 30 may (as part of step 816) actuate the beam steering arrangement of the particular beam to steer the beam back to point toward point P.

After steps 812-816 are executed for all of the beams in the subset S, the process 800 moves to step 818, where a next subset S of beams is selected (e.g., by the control subsystem 30) for beam steering adjustment. The next subset can be identical to the previous subset (i.e., the immediately preceding subset), or can be different from the previous subset. The two subsets may contain common beams, or may be disjoint subsets (in cases where the subsets are minority subsets). In cases where the subsets are majority subsets, the next subset and the previous subset necessarily intersect (i.e., at least one of the beams is contained in the previous subset and the next subset).

The process 800 then returns to step 802, where the beam steering arrangements for the beams of the next subset are actuated, by the control subsystem 30, to adjust the beam pointing vectors of the beams (in a random, pseudo-random, or pre-determined fashion). Steps 804-816 are then executed, similar to as before, but for the beams in the next subset.

In general, the process 800 is repeated multiple times for each subset. For example, if the beams are divided into three subsets, the process 800 is executed as follows: steps 802-816 are executed for the first subset and at step 818 the second subset is selected, steps 802-816 are executed for the second subset and at step 818 the third subset is selected, steps 802-816 are executed for the third subset and at step 818 the first subset is selected, steps 802-816 are executed for the first subset and at step 818 the second subset is selected, and so on as so forth until the process 800 terminates.

At each iteration of the process 800, the control subsystem 30 forms the comparison metric and evaluates the comparison metric against a threshold criterion. For example, the comparison metric can be formed by comparing the current value for a beam in the selected subset to the immediately preceding value for that beam to check whether the current value has increased (indicating that the beam is closer to being in alignment than as before) or decreased (indicating that the beam is more out of alignment than as before). As discussed, if no previous value is available for a particular beam (i.e., if the beam was not previously steered in order to perform intensity measurements and objective function evaluation), a default initial (i.e., dummy) value can be used.

Since the control subsystem 30 is able to complete the evaluation of the objective functions for all of the beams in a single subset within a few hundred microseconds, evaluation of the objective function for all of the beams can be typically completed in less than one millisecond.

It is noted that the subsets are selected in a way such that each beam is steered and its objective function is evaluated multiple times (i.e., at multiple iteration steps), e.g., on the order of hundreds or thousands of times during the engagement of the system 10 on the target. The allocation of beams to the subsets is performed by the control subsystem 30 and is preferably static, i.e., the control subsystem 30 allocates the beams to the respective subsets prior to the initial execution of the process 800. However, in certain non-limiting implementations the allocation of beams to the respective subsets may be dynamic.

In certain non-limiting implementations, for each of the beams, the corresponding beam steering arrangement adjusts the beam pointing vector (at step 802) of the beam by a relatively small amount, which can be, in certain cases, proportional to a fractional value of the immediately preceding value (i.e., the value calculated at step 810 in previous iteration for the beam). It is also noted that although two examples control techniques were described above, the control subsystem 30 may apply a variety of control algorithms as part of the execution of steps 812-816, including, for example, proportional-integral-derivative (PID) control, as is well-known in the art of control systems.

The process 800 may continue to iterate throughout the duration of the engagement of the system 10 on the target, or until a stopping criterion is reached, for example, until the beam pointing error of each of the beams is within an acceptable tolerance or the calculated value representative of the relative intensity (via evaluation of the objective function) for all of the beam is of a sufficient intensity level. For example, although not shown in the drawings, the control subsystem 30 may terminate the beam adjustment process upon successfully reaching step 814 for all of the beams after several iterations.

As mentioned, in certain non-limiting implementations the process 800 may include an initialization step in which the control subsystem 30 selects the selected subset S of beams. The initialization step may include executing steps similar to steps 804-810, where the phase modulators of the beams in the subset are actuated to modulate the current phase of the beams, intensity measurements are performed, intensity variations are obtained (based on the intensity measurements), and the objective functions of all of the beams in the selected subset are evaluated (based on the intensity variations) to produce a calculated current value for each beam in the subset. At the first execution of step 802, the beam steering arrangements of the beams in the subset may be actuated to steer the beams proportional to, or in accordance with, the calculated current value.

In certain non-limiting implementations, the beam steering at step 802 can be performed in a non-random fashion. For example, each beam in the subset can be steered in accordance with the immediately preceding value associated with that beam if the immediately preceding value was a result of the execution of step 814.

It is generally noted that the beam alignment correction process (i.e., the process 800) can be incorporated as a sub-process of the process for phase correcting described in WO 2020/016824 A1. Since both the phase correction and alignment correction processes utilize intensity measurements—in particular variations in intensity resulting from modulation of the current phase of the beams—the phase correction and alignment correction processes can be implemented in a nested-loop type of process. For example, step 802, in which the current phases of the beams are modulated between the at least three phase states can generally continue throughout the duration of the engagement of the system 10 on the target as it is required to correct for the phase differences between the beams that constantly evolve during the engagement time on the target. The remaining steps in the process 800 can be iterated (looped) for each beam so as to perform alignment correction for each beam. In working conditions in which the beam misalignment is dynamic, for example due to fluctuating atmospheric conditions caused by atmospheric turbulence, thermal stress, focusing errors, and the like, the alignment correction process can continue, preferably at a high re-visit rate, throughout the duration of the engagement time on the target. In working conditions in which the beam misalignment is static, for example due to instrumentation, the alignment correction process can continue periodically or intermittently.

As mentioned, the detector 28 may be integrated or in cooperation with an imaging system used for aiming the system 10. FIG. 9 shows schematically an example deployment of the detector 28 with an imaging system within the context of the system illustrated in FIGS. 1 and 3. An image sensor (camera 44) is deployed so as to receive radiation (coherent beams 14a, 14b and 14c) emitted by the beam sources 12a, 12b and 12c. The beam director 18 is (or directors 18a, 18b and 18c are) preferably configured to direct and focus the beams simultaneously on the detector 28 and the camera 44. The control subsystem 30 receives (via a data connection) images produced by the camera 44, and identifies the image pixel (or pixels) that roughly correspond to the position of the detector 28.

FIG. 10 shows schematically an example deployment of the detector 28 with an imaging system within the context of the system illustrated in FIGS. 2 and 4, in which the radiation (beams 14a, 14b and 14c transmitted by the beam sources, not shown) is reflected from the target 34. A beam splitter 46 is deployed to receive incoming radiation (light) reflected from the target 34 and collected by the telescope arrangement 42. The beam splitter 46 directs part of the received radiation to the detector 28, which senses the intensity of the laser spot on the "target" for processing by the control subsystem 30, and part of the received radiation to the camera 46, which forms an image spot on the target from which the reflected radiation emanates. The control subsystem 30 receives (via a data connection) images produced by the camera 46, and identifies the image pixel (or pixels) that roughly correspond to the position of the spot on the target.

It is noted that although the exemplary objective functions used for performing the beam alignment techniques described herein are derived based on a general Gaussian beam model assumption, this beam model assumption is only one non-limiting example of a beam model assumption that is particularly useful within the context of certain coherent beam combination systems. Other beam models may also be used, including, but not limited to, Bessel beam models and higher order (or transverse) Gaussian beam modes. Objective functions that are based beam phase modulation according to discrete stepped modulation or continuous/sinusoidal modulation can also be derived, using the same or similar principles used in deriving the objective function of equations (4) and (5), as should be apparent to those of ordinary skill in the art.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for aligning beams of a coherent beam combination (CBC) device directed towards a target, the beams having associated adjustable phase modulators and beam steering arrangements, the method comprising:
    (a) for each of the beams in a subset of the beams, actuating the corresponding beam steering arrangement to steer the beam;
    (b) for each of the beams in the subset, actuating the corresponding phase modulator to modulate a current phase of the beam between at least three phase states;
    (c) monitoring an intensity parameter that varies as a function of an intensity of radiation impinging on the target; and
    (d) calculating, for each of the beams in the subset, a current value representative of a relative intensity of the beam based at least in part on the monitored intensity parameter at each of the at least three phase states, wherein the calculated value is indicative of a current position of the beam relative to the target.

2. The method of claim 1, further comprising:
    (e) for each of the beams in the subset, adjusting a beam pointing direction of the beam in accordance with the calculated current value.

3. The method of claim 1, further comprising:
    (e) for each of the beams in the subset, forming a comparison metric based on the calculated current value and at least one preceding value representative of the relative intensity associated with the beam; and
    (f) if the comparison metric satisfies a threshold criterion,
        (i) storing the calculated current value, and
        (ii) keeping the beam steered to the current position.

4. The method of claim 3, further comprising:
(g) if the comparison metric fails to satisfy the threshold criterion, actuating the beam steering arrangement of the beam to steer the beam to a previous steering position.

5. The method of claim 3, further comprising:
(g) selecting a next subset of the beams; and
(h) repeating (a)-(g).

6. The method of claim 1, wherein the calculating the current value is performed by evaluating an objective function having input based on the monitored intensity parameter at each of the at least three phase states, and wherein the objective function is derived from analysis of a beam model.

7. The method of claim 6, wherein for each beam, the objective function has a single maximum that is achieved when the beam is positioned so as to be centered on the target.

8. The method of claim 1, wherein the intensity parameter is derived from a sensor sensitive to the beams located at the target.

9. The method of claim 1, wherein the intensity parameter is derived from a sensor deployed to sense radiation that is reflected from the target.

10. The method of claim 1, wherein for each of the beams in the subset the current value is representative of the relative intensity of the beam relative to the sum of all of the beams in the subset.

11. The method of claim 1, wherein the current phase of each of the beams is modulated in a manner selected from the group consisting of: a stepped manner between the at least three phase states, and a substantially continuous manner over a range of modulation frequencies encompassing the at least three phase states.

12. The method of claim 1, wherein the current phase of each of the beams is modulated sinusoidally over a range of modulation frequencies encompassing the at least three phase states.

13. The method of claim 1, wherein the current phases of a plurality of the beams are varied sequentially.

14. The method of claim 1, wherein the beams in the subset are steered in a random or pseudo-random fashion.

15. A system comprising:
(a) an array of beam sources configured to generate a plurality of coherent beams for directing towards a target;
(b) a plurality of adjustable phase modulators associated with the beam sources so as to allow adjustment of relative phase offsets of the beams;
(c) a plurality of beam steering arrangements associated with the array of beam sources configured to steer the coherent beams;
(d) a detector deployed for monitoring an intensity parameter that varies as a function of an intensity of radiation impinging on the target; and
(e) a control subsystem associated with the detector to receive the intensity parameter, the control subsystem further associated with the phase modulators and the beam steering arrangement, the control subsystem configured to:
(i) actuate the beam steering arrangements associated with a subset of the beam sources to steer the beams generated by the beam sources in the subset,
(ii) for each of the beams in the subset, actuate the corresponding phase modulator to modulate a current phase of the beam between at least three phase states, and
(iii) calculate, for each of the beams in the subset, a current value representative of a relative intensity of the beam based at least in part on the monitored intensity parameter at each of the at least three phase states, wherein the calculated value is indicative of a current position of the beam relative to the target.

16. The system of claim 15, wherein the control subsystem is further configured to:
(iv) for each of the beams in the subset, actuate the corresponding beam steering arrangement to adjust a beam pointing direction of the beam in accordance with the calculated current value.

17. The system of claim 15, wherein the control subsystem is further configured to:
(iv) for each of the beams in the subset, form a comparison metric based on the calculated current value representative of the relative intensity of the beam and at least one preceding value representative of the relative intensity value associated with the beam; and
(v) if the comparison metric satisfies a threshold criterion,
(1) store the calculated current value, and
(2) keep the beam steered to the position.

18. The system of claim 17, wherein the control subsystem is further configured to:
(vi) if the comparison metric fails to satisfy the threshold criterion, actuating the beam steering arrangement of the beam to steer the beam to a previous steering position.

19. The system of claim 17, wherein the control subsystem is further configured to:
(vi) select a next subset of the beams, and
(vii) repeat (i)-(vi).

20. The system of claim 15, wherein the control subsystem is configured to calculate the current value by evaluating an objective function having input based on the monitored intensity parameter at each of the at least three phase states, and wherein the objective function is derived from analysis of a beam model.

* * * * *